(12) United States Patent
Mazot

(10) Patent No.: US 6,367,771 B1
(45) Date of Patent: Apr. 9, 2002

(54) BUTTERFLY VALVE WITH OFFSET BEARINGS

(76) Inventor: Lucien Mazot, 5, rue Paul Reineville, 95770 Montreuil sur Epte (FR)

( * ) Notice: Subject to any disclaimer, the term of this patent is extended or adjusted under 35 U.S.C. 154(b) by 0 days.

(21) Appl. No.: 09/462,530
(22) PCT Filed: Jul. 10, 1997
(86) PCT No.: PCT/FR97/01263
 § 371 Date: Mar. 27, 2000
 § 102(e) Date: Mar. 27, 2000
(87) PCT Pub. No.: WO99/02902
 PCT Pub. Date: Jan. 21, 1999
(51) Int. Cl.[7] .................. F16K 25/00; F16K 1/22; F16K 5/06
(52) U.S. Cl. .............. 251/305; 251/307; 251/315.07; 251/188
(58) Field of Search ................ 257/305, 161, 257/214, 307, 315.07, 188, 163, 298

(56) References Cited

U.S. PATENT DOCUMENTS

| | | | | |
|---|---|---|---|---|
| 3,272,223 A | * | 9/1966 | Sass | 251/161 |
| 3,429,553 A | * | 2/1969 | Smith et al. | 251/161 |
| 3,591,127 A | * | 7/1971 | Luger | 251/161 |
| 5,186,433 A | * | 2/1993 | Pausch | 251/304 |
| 5,755,427 A | * | 5/1998 | Koskinas | 251/163 |
| 5,757,403 A | * | 5/1998 | Nagashima | 347/50 |
| 6,042,083 A | * | 3/2000 | Lee | 251/161 |

FOREIGN PATENT DOCUMENTS

| | | |
|---|---|---|
| FR | 1392279 | 4/1964 |
| FR | 2745057 | 8/1997 |

* cited by examiner

Primary Examiner—Kevin Shaver
Assistant Examiner—David A Bonderer
(74) Attorney, Agent, or Firm—Harness, Dickey & Pierce, P.L.C.

(57) ABSTRACT

The device concerns a device for adjusting the relative distance or position between a check valve and the base on which it rests when it is closed. Said device consists of a valve body (1), a valve shaft (5), a check valve (5) and two bearings (2 and 3) and a base (6). The inner bores of the bearings are offset relative to their external diameter. The adjustment is carried out by appropriately positioning the bearings inside the valve body. The device is particularly designed for rotating butterfly or ball taps and valves.

7 Claims, 6 Drawing Sheets

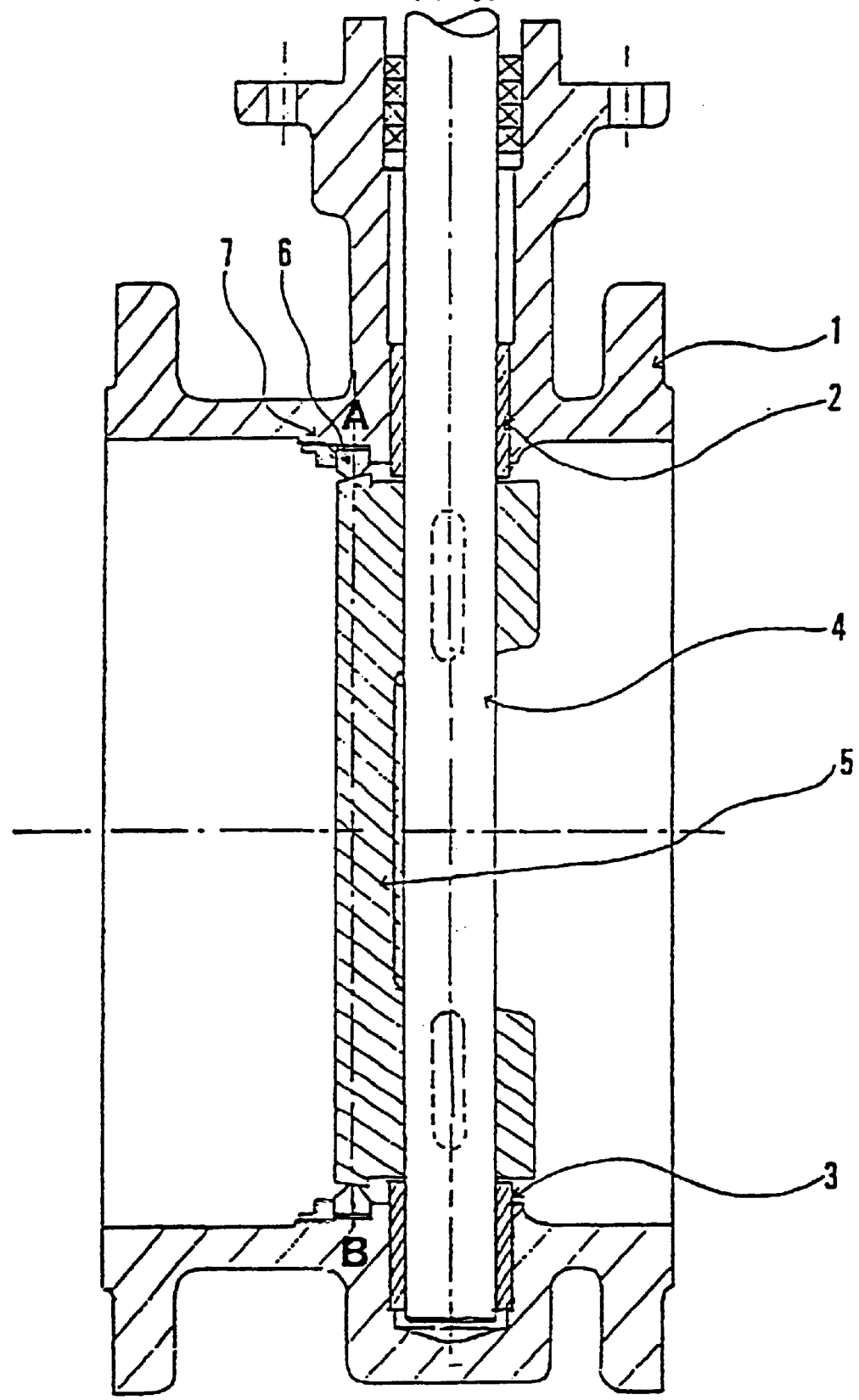

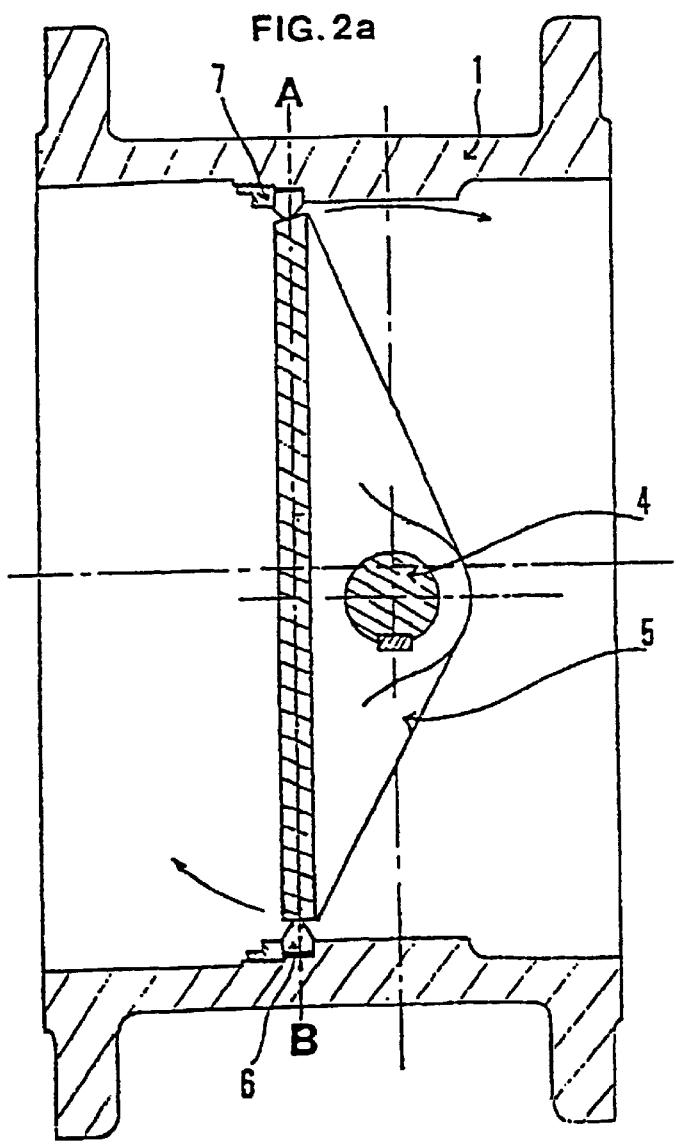
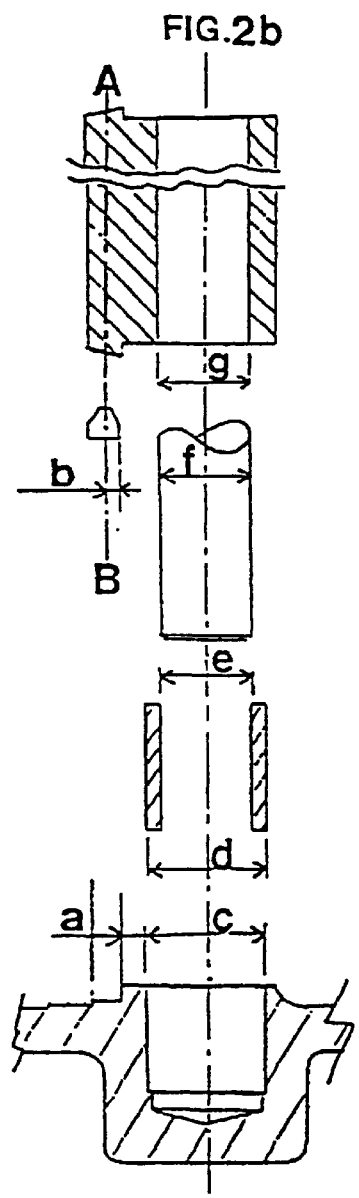

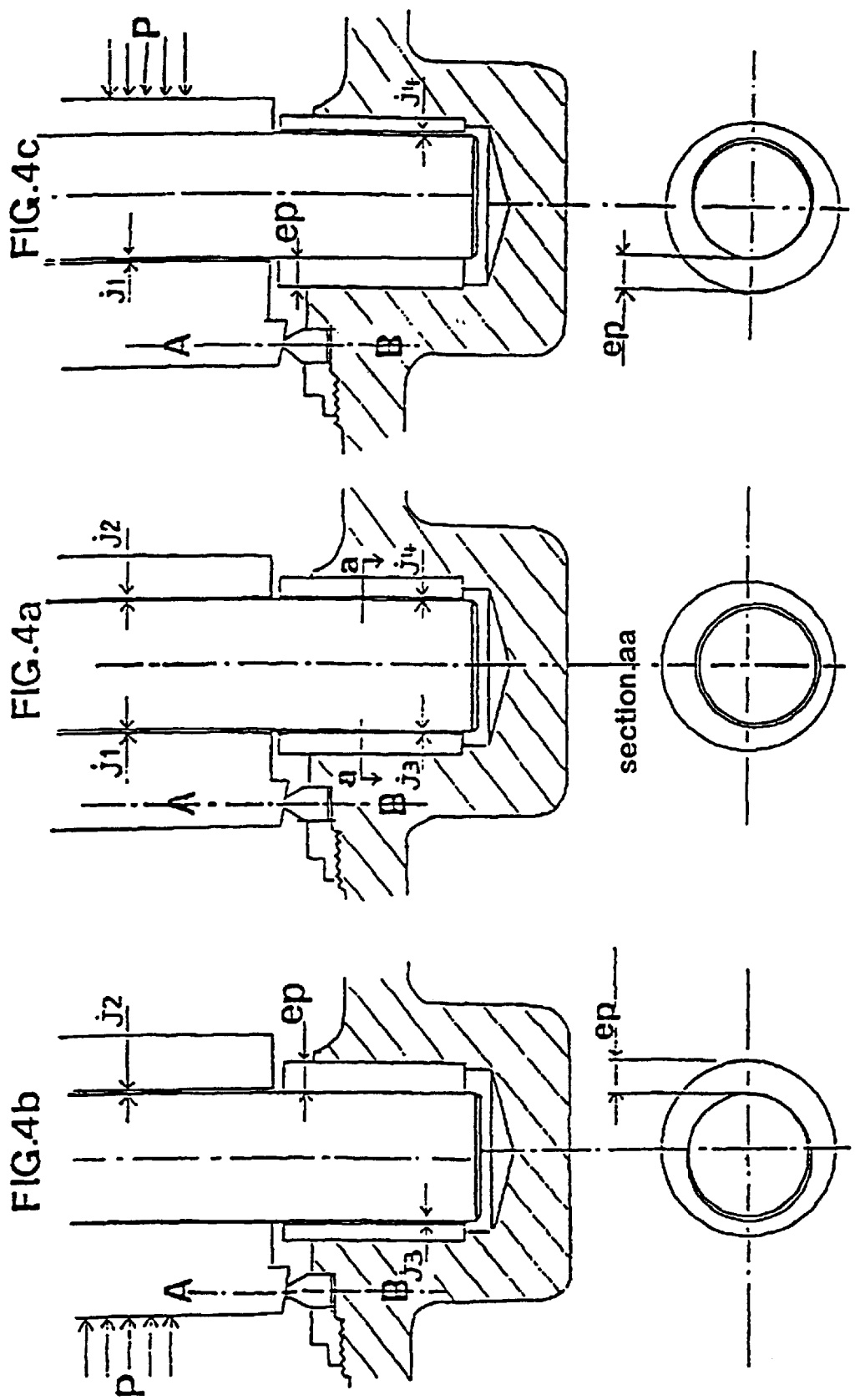

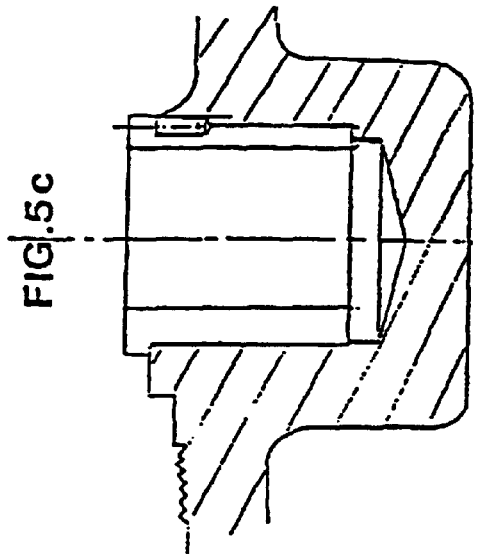
FIG.5c
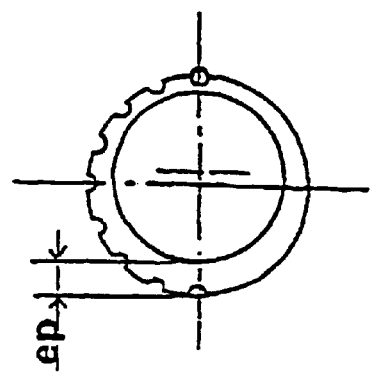
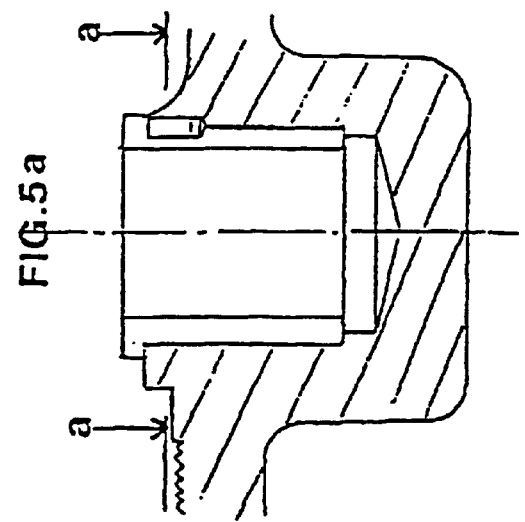
FIG.5a
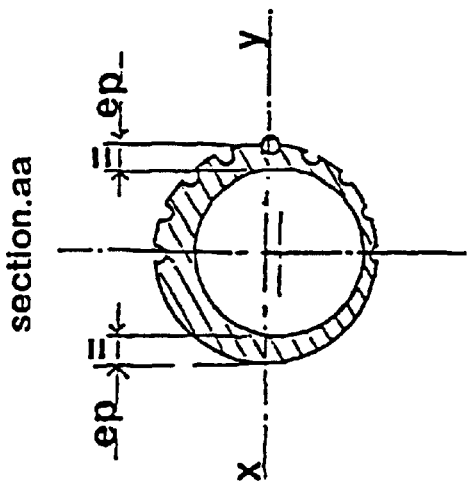
section.aa
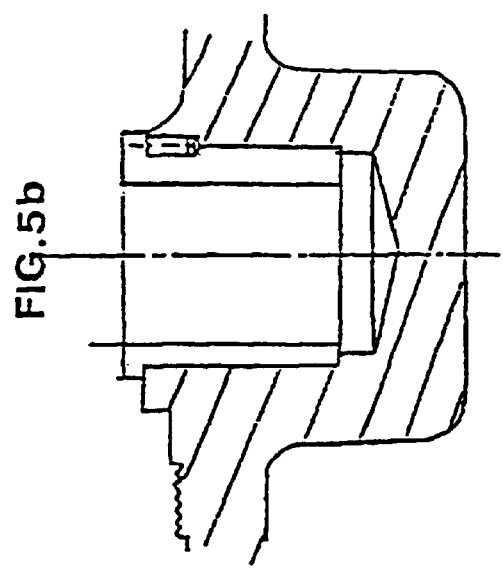
FIG.5b
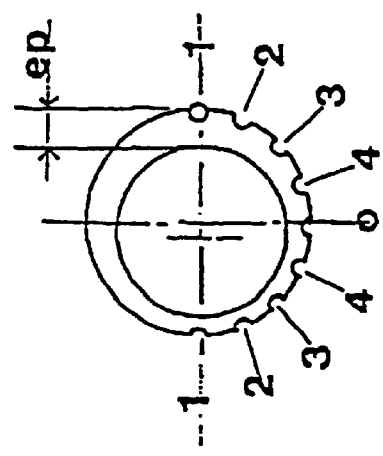

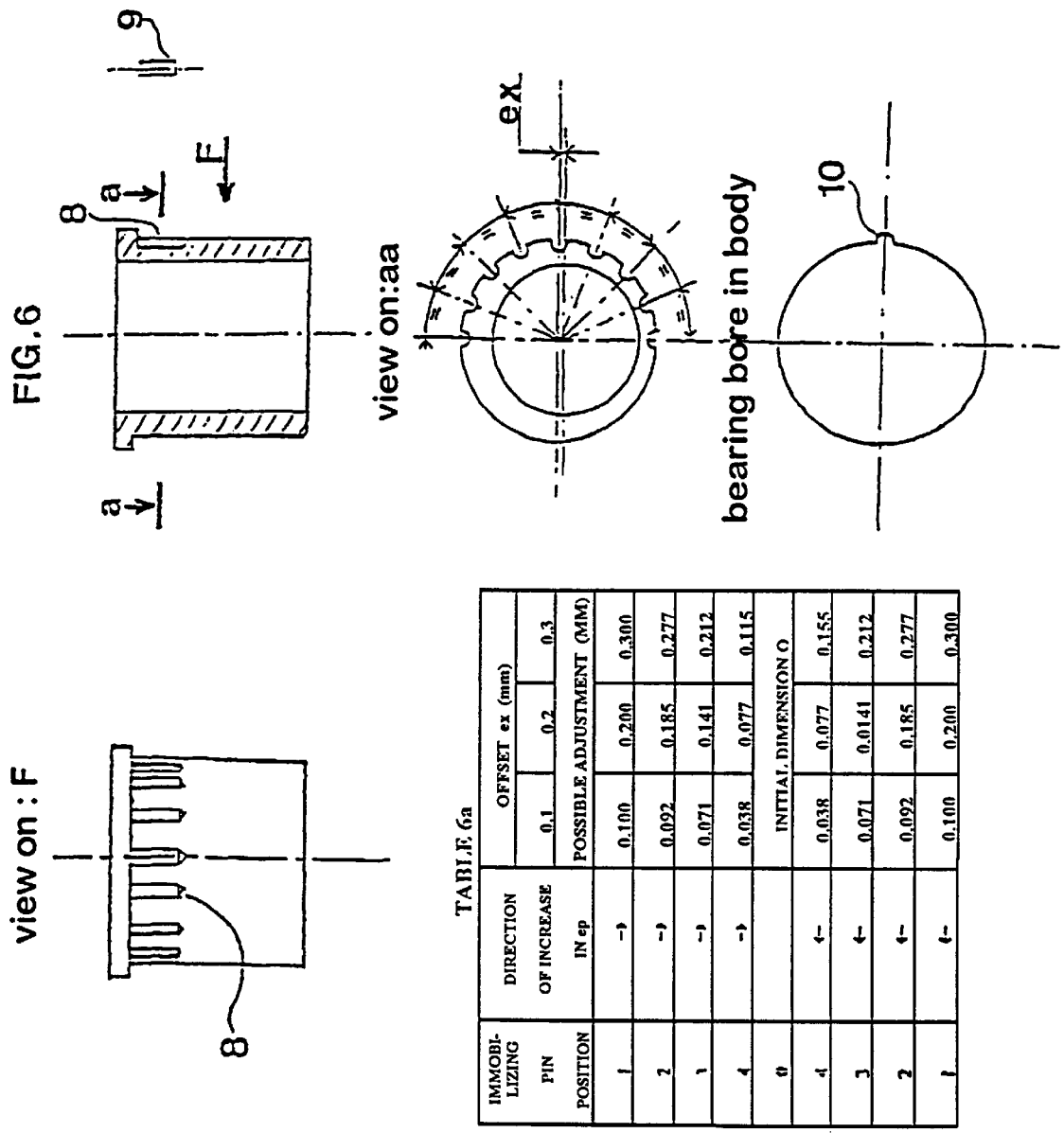

BUTTERFLY VALVE WITH OFFSET BEARINGS

BACKGROUND OF THE INVENTION

The present invention relates to a device for adjusting and varying the bearing position of the plug (mobile part) on the seat (fixed part) of a rotary shaft valve when the valve is closed.

1. Field of the Invention

Almost all single, double or triple offset rotary shaft valves have sealing and adjustment characteristics which are mechanically dependent on the relative position of the plug and the seat on which it bears when the valve is closed.

Sealing and adjustment performance will be optimal only if the theoretical bearing line of the plug of the valve, whether it be circular, elliptical or any other shape, is strictly superposed on and coincident with the same theoretical bearing line of the seat, to achieve this the two bearing lines must imperatively and simultaneously be geometrically identical and superposable in space.

2. Description of Prior Art

In conventional prior art rotary valves with concentric bore bushings it is practically impossible to superpose the bearing line of the plug with the bearing line of the seat; any approximation is realizable in practice only by extremely precise machining of the component parts, leading to a very high manufacturing cost of the finished product; moreover, progressive wear of the component parts modifies the original dimensions of the parts and therefore destroys the original superposition of the bearing line of the plug on its seat and therefore contributes to progressive deterioration of the sealing characteristics, without any possibility of correcting them other than replacing the worn parts with new parts.

The conventional prior art valves cannot correct the reversing of the clearances between the component parts if the direction of the fluid in the valve is reversed.

The device of the invention remedies these drawbacks.

BRIEF SUMMARY OF THE INVENTION

In accordance with the first feature of the invention it has two offset bushings:

By offset bushings we mean bushings whose internal bore is offset relative to the outside surface, the thickness ep (FIG. 3.b) of these bushings in the device of this invention becomes adjustable, so that merely rotating the bushings enables adjustment for correcting, without additional cost:

dimensional variations due to manufacturing tolerances of the component parts (plus or minus relative to the nominal dimension), wear of the parts, reversing of the location of the mechanical clearances between the mobile parts resulting from reversing the direction of the fluid in the valve body.

The appended drawings illustrate the invention.

BRIEF DESCRIPTION OF THE DRAWINGS

FIG. 1 and FIG. 2.a show in section a valve body comprising the valve body 1), the top bushing 2, the bottom bushing 3), the valve shaft 4), the valve plug 5), the seat 6), the seat immobilizing ring 7).

FIG. 2b shows the eccentric bearing.

FIGS. 3a–4c show the different positions of the bearing during actuation.

FIGS. 5a–6 show another embodiment of the preferred invention.

Figure 3C:
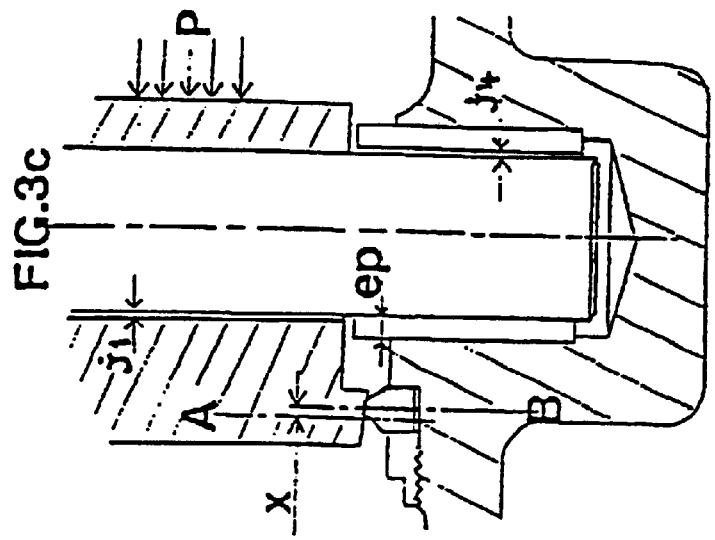

TABLE 6a shows a table with examples of the variation in the off set of the stem.

DETAILED DESCRIPTION OF THE PREFERRED EMBODIMENT

The valve body 1 defines a cavity through which a fluid can flow. The rotating shaft 4 carries said plug 5 and defines an axial direction. Said body 1 comprises a top orifice and a bottom orifice extending axially. The top bushing 2 and tho bottom bushing 3 are adapted to be introduced in the top orifice and the bottom orifice, respectively, only from said valve cavity.

Each bushing 2, 3 has an outside surface adapted to be received in a peripheral surface of the corresponding orifice and an internal bore adapted to receive axially said shaft 4.

The bushings 2) and 3) shown represent the conventional prior art, these bushings are of the traditional type, the internal bore being concentric with the outside surface.

The plug shown is of the double offset butterfly valve type, but the present invention is equally applicable to, and has the same advantages for, other butterfly valves or spherical plug valves or hard conical bearing surface or resilient bearing surface valves, or even valves with a flexible seal.

The line A–B in FIG. 1 and FIG. 2.a represents the theoretical bearing line of the plug and the bearing line of the seat, which two lines are strictly superposed and coincident.

By definition, for the plug-seat assembly to be sealed when the valve is closed, the bearing line A–B of the plug must be absolutely superposed on the bearing line A–B of the seat when the valve is closed.

Although absolute superposition can be approximated in the production of prototypes, it is virtually impossible to achieve on an industrial scale because of the machining (min-max) tolerances of each part, clearly the machining tolerances of the dimensions a and b FIG. 2.b have a great influence on operation and must consequently be very precise, i.e. costly.

What is more, the assembly and the operation of the various mobile parts FIG. 2b bushing, shaft, plug require a certain minimum mechanical clearance between:

diameter c of the peripheral surface of the orifice adapted to receive a bushing and the diameter d of the outside surface of the bushing adapted to be received in an orifice of the valve body.

the diameter e of the internal bore of the bush adapted to receive the shaft and the diameter f of the shaft.

the outside diameter of the shaft, dimension f and the shaft bore in the plug dimension g.

Note also that the pressure of the fluid inside the valve applies forces tending to push the mobile parts in the direction of the fluid, because of this effect the clearances are localized between the non-bearing surfaces of the parts; when the direction of the fluid in the valve is reversed the location of the clearances is equally reversed 180°.

Figure 3A:
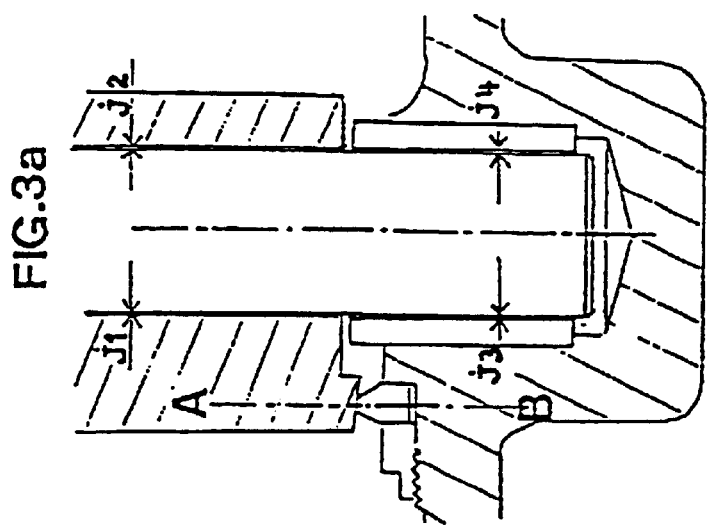
Figure 3B:
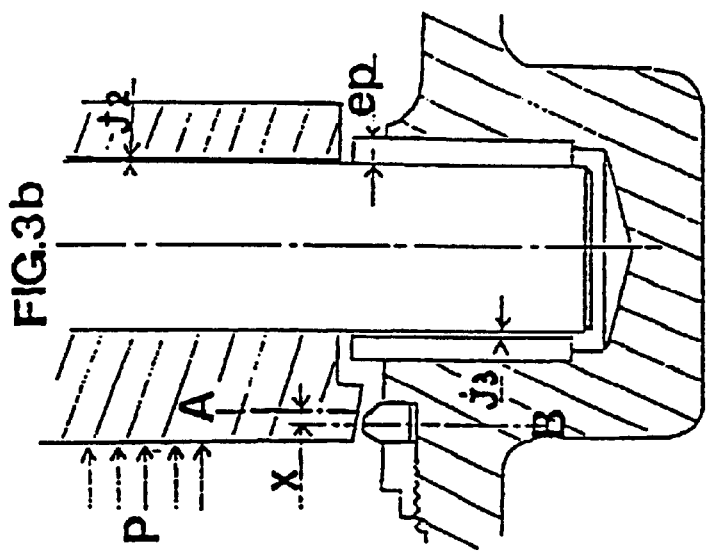

FIGS. 3.a, 3.b and 3.c show the positions of the bearing line A–B of the plug relative to the bearing line A–B of the seat and the position of the mechanical clearances between each component part in three situations:

FIG. 3.a valve, without fluid (atmospheric pressure)

FIG. 3.b valve, fluid P pushing the plug from left to right.

FIG. 3.c valve, fluid P pushing the plug from right to left.

FIG. 3.a shows the valve without fluid, i.e. without internal pressure (atmospheric pressure), it can be seen that the clearances j1, j2, j3 and j4 are equally divided on respective opposite sides of the valve shaft.

The bearing line A–B of the plug is superposed on the bearing line A–B of the seat.

FIG. 3.b shows the valve in use, the pressure of the fluid P pushing the plug from left to right; it can be seen that the clearances j1 and j4 are eliminated and therefore zero but that the clearances j2 and j3 have doubled in value; in practice the clearances are added and they assume a position on the non-bearing side, for example the clearance j2 in FIG. 3.b corresponds to the sum of the clearances j1+j2 from FIG. 3.a; this displacement of the clearances causes a displacement of the mobile parts bringing about a displacement of the bearing line A–B of the plug (toward the right, i.e. in the direction of the fluid) relative to the line A–B of the seat, the plug/seat bearing lines will no longer be superposed or coincident: the plug bearing line A–B of the plug has moved an amount X relative to the bearing line of the seat, which degrades sealing performance.

FIG. 3c shows the valve in use, the fluid P pushing the plug from right to left; it can be seen that the clearances j2 and j3 are eliminated and therefore zero but that the clearances j1 and j4 have doubled; in practice the clearances are added and they assume a position on the non-bearing side, for example the clearance j4 in FIG. 3.c corresponds to the sum of the clearances j3+j4 from FIG. 3.a. This causes displacement of the bearing line A–B of the plug (toward the left, i.e. in the direction of the fluid) relative to the line A–B of the seat; the consequences will be identical to those cited in the above paragraph.

FIGS. 4a, 4b and 4c show how the device of the present invention remedies these drawbacks.

FIG. 4.a again shows the valve not in use, i.e. with no internal pressure (atmospheric pressure) it can be seen that the clearances j1 and j2, j3 and j4 are equally divided on respective opposite sides of the shaft.

FIG. 4.b shows the valve in use, the pressure of the fluid P pushing the plug from left to right, it is clear that the clearances are positioned in a similar manner to FIG. 3.b but it can be seen that the bearing line A–B of the plug is, by virtue of the device in accordance with the invention, superposed on and coincident with the bearing line A.B of the seat, the thickness of the bushing ep is increased to compensate the clearances or wear; the valve under pressure retains its sealing qualities.

FIG. 4.c shows the valve in use, the pressure of the fluid P pushing the plug from right to left, it can clearly be seen that the clearances are positioned identically to FIG. 3.c but it can be seen that the bearing line A.B of the plug is, by virtue of the device of the invention, superposed on the bearing line A.B of the seat, the thickness of the bushing ep is increased to compensate the clearances or wear; the valve retains its sealing qualities.

Depending on the design of the valve, it is possible to use only one offset bearing, the second bushing being of the conventional type.

DESIGN OF THE OFFSET BUSHING

The offset bushing is characterized by a internal bore whose center is offset realtive to its outside surface. The offset ex can vary as required. FIG. 5.a shows the bushing in a neutral position, position 0, it can be seen that the thickness of the bushing ep of the offset bushing is on the identical axis xy on each side of the shaft, FIG. 5.b shows the offset bushing after it has rotated 90° clockwise, the bearing thickness ep is maximum to the right of the shaft of the valve, FIG. 5.c shows the offset bushing after it has rotated 90° anticlockwise, the thickness of the bushing ep is maximum to the left of the shaft of the valve.

FIG. 6 shows the geometry of the bushing.

Table 6.a shows by way of example the possible adjustment by dimensional variation of the bearing thickness ep for offsets ex of the bushing of 0.1 mm, 0.2 mm and 0.3 mm.

DETAILED DESCRIPTION OF THE INVENTION

The offset bushings have on their outside diameter semi-cylindrical grooves (8) extending 180°. FIG. 5.a, 5.b and 5.c show from a neutral position 0, FIG. 5.a and FIG. 5.b, four positions (1, 2, 3 and 4) enabling the thickness ep of the bushing on the right of the shaft to be increased FIG. 5.b and four other positions (4, 3, 2 and 1) enabling the thicknesses ep of the bushing on the left of the shaft to be increased FIG. 5.c.

The axial length of each groove 8 is smaller than the length of the orifice adapted to house the corresponding bush. Each groove 8 extends axially outwardly from the valve cavity surface.

The orifice adapted to house the offset bushing 2, 3 has on its peripheral surface a semi-cylindrical slot 10. The axial length of the slot 10 is smaller than the length of the orifice and extends axially outwardly from the valve cavity surface. By adding a locking pin (9) accommodated in the hole formed by a groove on the bushing coinciding with the slot in the orifice, the bushing can be positioned in the required position, the pin (9) prevents any possible rotation of the bushing, this positioning of the bushing can be achieved in a manner different to that described either by keys and keyways or by steel walls housed in holes. By way of non-limiting example the diameter of the immobilizing pin (9) can be of 4 mm diameter for a bearing outside surface of 25 mm.

The immobilizing pin 9 can be engaged in the hole only from the valve cavity at the moment of assembling the valve.

In the particular embodiment illustrated by FIGS. 5 and 6, the offset bushing 2, 3 comprises a flange. When the offset bushing 2, 3 is housed in the orifice, the flange extends axially out of the orifice in the valve cavity, the radial surface of the flange adjacent the valve cavity surface abutting the valve cavity surface. In this particular embodiment, said grooves 8 of said bushing 2, 3 extend axially outwardly from said radial surface. The flange does not comprise any part of said grooves (FIG. 6).

The immobilizing pin 9 is inserted in the groove 8 whose angular position allows to superpose the bearing line of the seat with the bearing line of the plug. After having inserted the pin 9 in the predetermined groove 8 by a radial traslation, the bushings 2, 3 (with the pin 9) is engaged in the orifice by an axial translation, the part of the pin 9 extending out of the outside surface of the bushings 2,3 being engaged in the slot 10 of the orifice.

The offset of the bushing causes simultaneously with its rotation a lateral displacement perpendicular to the axis xy FIG. 5.a, this displacement will be compensataed by self-centering of the seat in its housing.

The number of possible positions will depend on the dimensions of the bushings and the pin (9), FIG. 5 shows for example four plus four positions equally distributed every 2.5° over 180°, this is not limiting, the distribution can be variable and appropriate according to the needs of the manufacturer.

The device in accordance with the invention is particularly intended for adjusting the bearing surfaces of the plugs on their plug seat of single or double offset butterfly valves and ball or spherical plug valves, whether they have a hard metallic or flexible bearing surface or a flexible seal.

What is claimed is:

1. A rotary valve comprising:

a rotatable shaft defining an axial direction having a plug defining a bearing line;

a seat with a bearing line;

a valve body defining a cavity through which fluid can flow, said valve body further defining first and second bores axially disposed with said cavity, said first bore having a first bore surface, said first bore surface having a bore length and defining an axial slot, said axial slot having a length less than the bore length;

a first bushing adapted to be disposed in said first bore by introduction through said cavity, said first bushing having a peripheral surface adapted to be rotatably received by said first bore surface, said peripheral surface having a peripheral surface length and defining a plurality of axial grooves, said axial grooves having a length less than the peripheral surface length, said first bushing defining a first bushing bore which is offset relative to said peripheral surface, said first bushing being adjustable in position by rotation within said first bore to compensate the mechanical machining tolerances of the valve so that said bearing line of said plug is superposed to said bearing line of said seat when said seat is closed;

an immobilizing pin disposed between said slot and one of said grooves wherein said immobilizing pin is insertable into said slot only from the cavity and wherein said immobilizing pin prevents rotation of said first bushing within said first bore, said immobilizing pin being internal to said valve body so that the adjustment of said bushing cannot be changed from outside the valve; and a second bushing adapted to be disposed within said second bore, said first and second bushing capable of accepting said rotatable shaft.

2. The rotary valve according to claim 1, wherein said grooves are disposed over approximately one half of the peripheral surface.

3. The rotary valve according to claim 1, wherein said first bushing comprises a flange having a radial surface adjacent to said cavity, said grooves extending axially outward from said radial surface.

4. The rotary valve according to claim 1, wherein the offset of said first bushing bore is between 0.1 and 0.3 mm.

5. The rotary valve according to claim 1, wherein said second bore has a second bore surface; and said second bushing is adapted to be disposed in said second bore by introduction through said cavity, said second bushing having a peripheral surface adapted to be rotatably received by the second bore surface, said peripheral surface having a peripheral surface length and defining a plurality of axial grooves, said grooves having a length less than the peripheral surface length, said second bushing defining a second bushing bore which is offset relative to said peripheral surface, said second bushing being adjustable in position by rotation in said second bore.

6. The rotary valve according to claim 1, wherein the bottom bore is a blind bore.

7. The rotary valve according to claim 1, wherein the plug has two fixed eccentricities.

* * * * *